United States Patent

Gewalt

[15] 3,659,873
[45] May 2, 1972

[54] LIFTING AND TOWING BAR FOR KING PIN EQUIPPED VEHICLES

[72] Inventor: Richard W. Gewalt, Route 2, Box 267, Attalla, Ala. 35954

[22] Filed: Sept. 9, 1970

[21] Appl. No.: 70,685

[52] U.S. Cl. ................280/415 A, 214/86 A, 280/491 R
[51] Int. Cl. ..............................................B60d 1/14
[58] Field of Search............280/415 A, 415 R, 415 B, 423 R, 280/491 E, 47.13, 47.17, 47.18, 47.24; 214/86 A

[56] References Cited

UNITED STATES PATENTS

| | | | |
|---|---|---|---|
| 1,908,704 | 5/1933 | Hamren | 280/491 A |
| 1,939,863 | 12/1933 | Seiter | 280/47.13 B |
| 2,867,451 | 1/1959 | Repke | 214/86 A |

Primary Examiner—Philip Arnold
Attorney—Jennings, Carter & Thompson

[57] ABSTRACT

A lifting and towing bar for king pin equipped vehicles comprising a bar long enough to project from the king pin outwardly of the forward end of the vehicle, together with a king pin connector at the rear of the bar so designed that the same may be slipped over the king pin, and with seats to receive the lower end of the king pin, so that when in place and the front end of the bar is raised the bar is locked against horizontal and vertical movement relative to the king pin, permitting the vehicle to be raised and towed by attaching a lifting hook to the forward end of the bar 3 Claims, 5 Drawing Figures Patented May 2, 1972

3,659,873

INVENTOR.
Richard W. Gewalt
BY
Jennings Carter & Thompson
Attorneys

LIFTING AND TOWING BAR FOR KING PIN EQUIPPED VEHICLES

This invention relates to a lifting and towing bar for king pin equipped vehicles, such for instance as the usual highway trailer which is towed by a tractor equipped with a fifth wheel.

In the use of highway tractors which tow king pin equipped trailers, whenever an accident occurs which necessitates towing of the trailer from the accident scene by another vehicle, great difficulty has been experienced in raising the front, wheelless end of the trailer, and towing it to its destination. Various types of slings, jacks, and other forms of lifting devices for such trailers have been proposed. However, all of these devices are cumbersome, difficult to put into position and maintain in position and are dangerous to the operator and quite likely to give way when the towing vehicle starts moving the trailer, especially if the trailer is not on a level surface, for instance in a ditch, or has to be moved over other obstructions.

My invention comprises a simple, rugged lifting and towing bar which may be slipped about the reduced portion of the king pin, and which is provided with seats for the lower end of the king pin so that when in this position and with a lifting vehicle attached to the forward end of the bar, the bar is locked against vertical and horizontal movement relative to the king pin, permitting the front end of the vehicle to be lifted and the vehicle towed away.

Specifically, I propose a heavy duty bar, long enough to reach from the king pin outwardly past the forward end of the vehicle. At its rear end the bar is bifurcated to provide a pair of fingers. The fingers are spaced apart only slightly more than the diameter of the reduced section of the king pin and in vertical dimension such fingers are slightly less than the depth or vertical extent of the reduced portion of the king pin. On their undersurfaces the fingers are provided with rounded seats, slightly larger in diameter than the enlarged, lower end of the king pin. By simply sliding the fingers about the reduced end of the king pin, and then lifting upwardly on the outer end of the bar which extends past the forward end of the vehicle, the larger diameter portion of the bottom of the king pin fits in the seats, thereby locking the bar to the pin both horizontally and vertically, permitting the vehicle to be lifted and towed by attaching a towing vehicle to the front end of the bar.

A lifting and towing bar illustrating features of my invention is shown in the accompanying drawings forming a part of this application in which.

Figure 1:
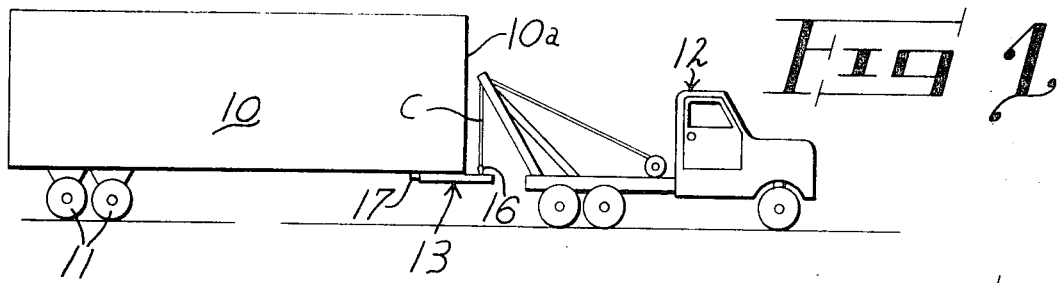
FIG. 1 is a wholly diagrammtic view illustrating a towing emergency vehicle transporting a trailer by means of my improved bar.

Referring now to the drawings I show in FIG. 1 a conventional highway trailer indicated at 10 having wheels 11. A wrecker or towing vehicle 12 is shown in towing position for moving the vehicle down the road, using my improved lifting and towing bar indicated generally by the numeral 13.

As best shown in the other figures, my improved bar 13 may comprise a heavy I-beam section which is long enough to extend from the king pin 14, which is located generally at the forward end of the trailer 10, to a position past the forward end 10a of the trailer. At a point past the forward end of the trailer I provide a lifting hook 16 to which the lifting cable C of the tow truck may be attached.

As is understood, the king pin 14 is a rod-like member approximately three inches in diameter, both at its upper end 14a and at its lower end 14b. Intermediate its upper and lower ends the king pin is reduced in diameter as indicated at 14c until in that section it is about 2 inches in diameter and about 1 ¾ inches long.

At its rear my improved lifting and towing bar is bifurcated by the provision of two rearwardly extending fingers 17 and 18. The inner surfaces 17a and 18a of these fingers are spaced apart a distance just slightly in excess of the diameter of the reduced portion 14c of the king pin. The vertical dimension of these fingers is slightly less than the length or vertical extent of the reduced section 14c.

Figure 5:
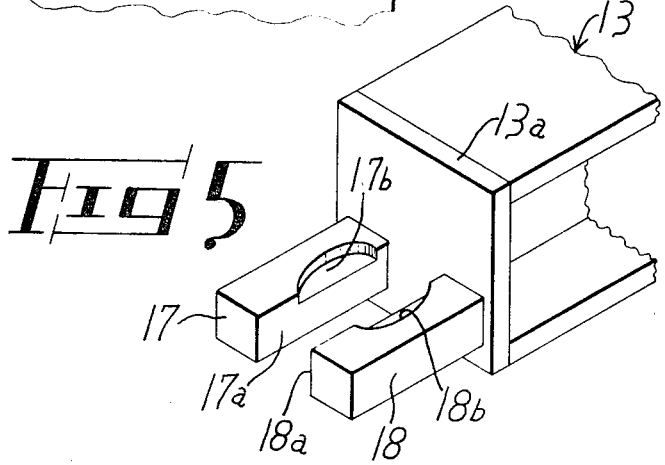

As best illustrated in FIG. 5, on their under surfaces and intermediate the ends thereof, the fingers 17 and 18 are provided with circular seats 17b and 18b. These seats are slightly larger in diameter than the enlarged, lower end 14b of the king pin 14.

In order to distribute the lifting load adjacent the forward under edge of the trailer I may provide, on top of the bar 13, a load distributing plate 19.

From the foregoing the method of constructing and using my improved lifting and towing bar, together with the several advantages thereof may now be more fully explained and understood. If it be assumed that the trailer 10 has broken loose from its tractor, whereupon the forward end 10a thereof is resting on the ground, when the emergency vehicle arrives at the scene it is only necessary either to raise the forward end 10a or to dig a trench under it so that my improved bar 13a may be put in place. This is accomplished by sliding the fingers 17 and 18 about the reduced diameter section of the king pin until such time as the fingers have moved rearwardly enough to receive the lower end 14b of the king pin in the arcuate cut outs or seats 17b and 18b. With this accomplished the cable C is attached to the lifting hook 16, bringing the plate 19 into engagement with the under surface of the forward end of the trailer. Lifting the forward end of the bar 13 firmly engages the king pin in the seats 17a and 18a and locks the fingers 17 and 18 both horizontally and vertically to the king pin, whereupon the vehicle may be towed away from the scene of the accident.

As stated, the bar 13 may be of heavy I-beam construction or otherwise and in the drawings I have illustrated the fingers as being attached to a plate 13a welded to the rear of the bar. However, different structural shapes may be employed for the bar if desired. In order to rigidly secure the fingers 17 and 18 to the plate 13a, I may round the ends 17c and 18c of the pins, pass these ends through holes drilled in the plate 13a, and weld the same in place.

Figure 2:
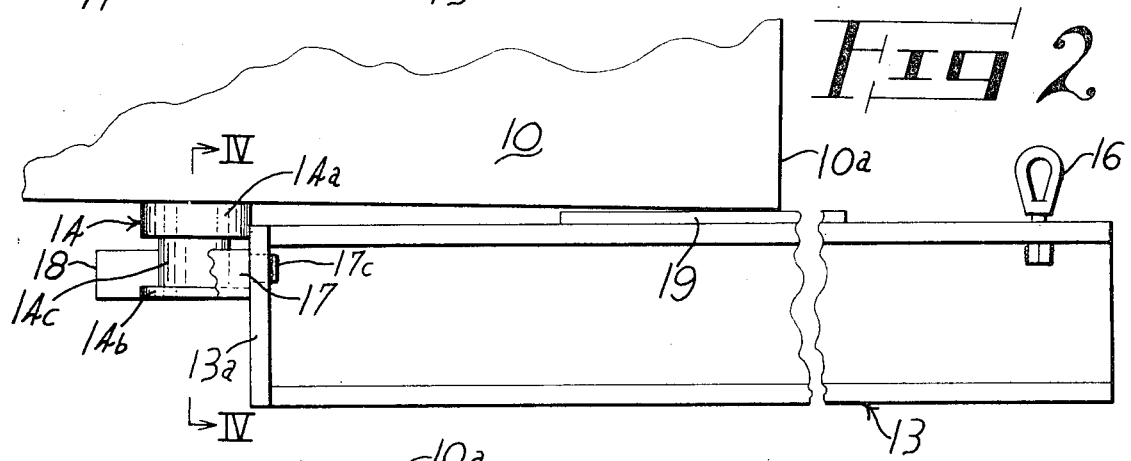
FIG. 2 is a side elevational view with certain parts broken away and enlarged over the showing of FIG. 1.
Figure 3:
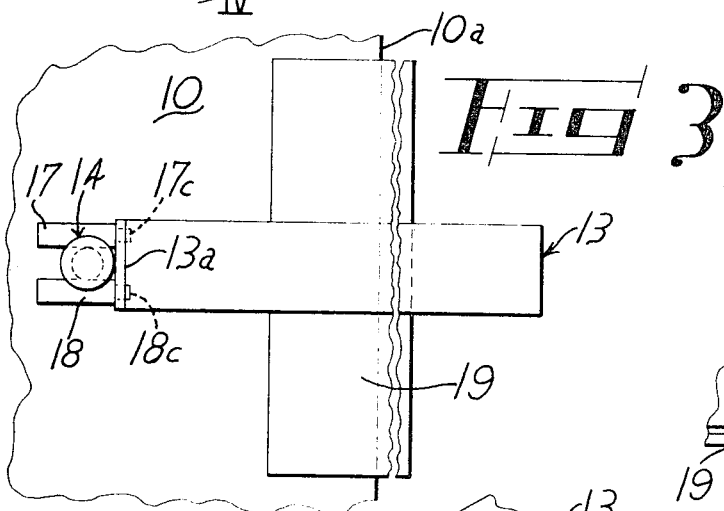
FIG. 3 is a fragmental bottom view with the bar in place about the king pin, parts being broken away.
Figure 4:
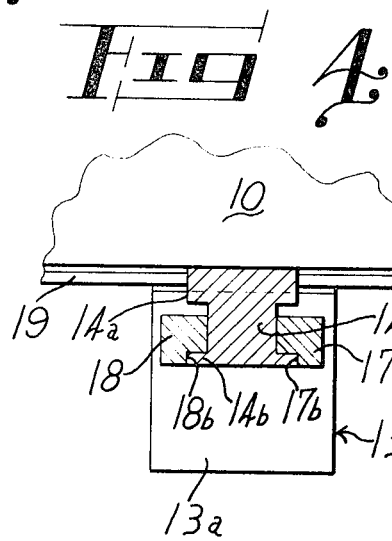
FIG. 4 is an enlarged detail sectional view taken generally along line 4—4 of FIG. 2; and, FIG. 5 is an isommetric bottom view showing the king pin engaging, bifurcated end of my improved bar.

From the foregoing it will be seen that I have devised a simple, rugged, safe lifting and towing bar for vehicles and the like equipped with a king pin. It will be readily apparent that when the fingers are about the king pin as illustrated in FIG. 2 and FIG. 4 of the drawings, the bar is locked as rigidly to the king pin as it is locked to the fifth wheel of its usual towing vehicle. Therefore, my improved bar makes perfectly safe the emergency towing of trailers, even though heavily loaded. The load distributing plate 19 prevents damage to the lower framework at the front of the trailer when lifting one which is heavily loaded.

In actual practice my invention has proven to be extremely satisfactory and I have used it on a number of occasions to safely, swiftly and economically recover highway trailers from scenes of accidents where the same have broken loose from their towing tractors.

While I have shown my invention in but one form, it will be obvious to those skilled in the art that it is not so limited, but is susceptible of various other changes and modifications without departing from the spirit thereof.

What I claim is:

1. In apparatus for lifting and towing a vehicle provided adjacent its forward end with a king pin of the kind having a reduced diameter section intermediate its upper and lower ends,
   a. a bar long enough to reach from the king pin to a position past the forward end of the vehicle,
   b. a bifurcated king pin connector at the rear end of the bar having fingers spaced from each other a distance slightly greater than the diameter of the reduced section of the king pin and of a depth less than the length of said reduced section of the king pin, and c. seats on the undersides of said fingers disposed to receive the lower, larger diameter end of the king pin, whereby said bifurcated connector may be slid about the reduced section of the king pin and permit the lower, larger diameter portion of the king pin to engage in the seats, so that when so connected the bar is locked against vertical and horizontal movement relative to the king pin, permitting the vehicle to be lifted and towed from the forwardly projecting portion of the bar.

2. Apparatus as defined in claim 1 in which the bar, outwardly of the forward end of the vehicle, is provided with a lifting eye to which the cable of a lifting and towing vehicle may be attached.

3. Apparatus as defined in claim 1 in which the bar carries a load distributing member engagable with the underside of the vehicle to be lifted and towed.

* * * * *